United States Patent [19]

Graber

[11] Patent Number: 4,565,322

[45] Date of Patent: Jan. 21, 1986

[54] LIQUID SPRAY APPARATUS FOR DISPENSING LIQUID DROPLETS OF CONSTANT DROPLET SIZE

[75] Inventor: Alfred Graber, Fischbach-Göslikon, Switzerland

[73] Assignee: Ciba-Geigy AG, Basel, Switzerland

[21] Appl. No.: 560,653

[22] Filed: Dec. 12, 1983

[30] Foreign Application Priority Data

Dec. 21, 1982 [CH] Switzerland ........................ 7468/82

[51] Int. Cl.⁴ ................................................ B05B 3/10

[52] U.S. Cl. ...................................... 239/223; 116/74; 239/72; 415/25; 415/118

[58] Field of Search ......................... 239/223, 224, 72; 415/22, 25, 36, 39, 118; 116/74, 146

[56] References Cited

U.S. PATENT DOCUMENTS

| | | | |
|---|---|---|---|
| 1,318,638 | 10/1919 | Anthon et al. | 116/74 |
| 1,678,402 | 7/1928 | Magni | 116/74 |
| 2,124,339 | 7/1938 | Schellens | 415/118 |
| 3,491,609 | 1/1970 | Henderson | 78/310.87 |
| 4,275,838 | 6/1981 | Fangmeyer | 239/223 |
| 4,346,765 | 8/1982 | Workman, Jr. | 415/25 X |

FOREIGN PATENT DOCUMENTS

| | | | |
|---|---|---|---|
| 85427 | 8/1965 | Fed. Rep. of Germany . | |
| 1314414 | 12/1962 | France . | |
| 396670 | 12/1973 | U.S.S.R. | 415/25 |

*Primary Examiner*—Jeffrey V. Nase
*Assistant Examiner*—Daniel R. Edelbrock
*Attorney, Agent, or Firm*—Harry Falber

[57] ABSTRACT

A liquid spray apparatus comprises a pneumatic drive and automatic speed regulating device. To this end, a vane wheel which can be acted upon by an air stream is mounted axially displaceably on a shaft. The vane wheel is in contact with regulating elements which are moved radially outwardly at increasing speed by the influence of centrifugal forces. In doing so the regulating elements act upon the vane wheel in a manner such that it is displaced at least partially out of the range of the air stream.

10 Claims, 6 Drawing Figures

LIQUID SPRAY APPARATUS FOR DISPENSING LIQUID DROPLETS OF CONSTANT DROPLET SIZE

BACKGROUND OF THE INVENTION

This invention relates to a liquid spray apparatus for dispensing liquid droplets of constant droplet size, comprising a liquid container and a spray plate with a drive located in a spray head.

In order to spray chemical substances such as herbicides, insecticides and the like for agricultural application, there are known liquid spray apparatus having spray nozzles, such as are described in the German patent application Nos. 24 52 750 or 25 41 213. A serious drawback of these conventional spray nozzle apparatus consists in that the droplet size varies greatly. Small droplets evaporate rapidly or are carried away by the wind, so that they are ineffective. Droplets which are too large cause an unnecessarily high consumption of liquid and therefore a low efficiency.

A better efficiency is attained by apparatus having rotating discs such as have been described in German patent application Nos. 25 35 084 or 31 45 109. The liquid is directed on to the disc on which it is carried outwardly and from which it is flung off due to centrifual forces. By regulating the speed and by providing gear-tooth means on the periphery of the discs, the droplet size can be determined relatively exactly, whereby a highly uniform distribution of the liquid is guaranteed. However, the drive by means of transport wheels, on the one hand, or an electric motor, on the other hand, are of disadvantage. These apparatus are, indeed, relatively heavy and their operational life is limited because of a battery being used. Furthermore, these apparatus are subject to corrosion and their long term maintenance is expensive, because the batteries must be replaced periodically.

Due to their electrical drive means, the known apparatus are not suitable for use, e.g., in developing countries, in spite of the fact that there is a vast need for liquid spray apparatus particularly in these areas. Even a drive comprising transport wheels is not suited for use in those regions where, due to their topography, portable apparatus are required.

OBJECTS AND SUMMARY OF THE INVENTION

It is therefore an object of the invention to provide a liquid spray apparatus which is portable and simple to operate in a safe manner. Moreover, the apparatus should have a long operational life and be inexpensive to manufacture. This task is solved, in accordance with the invention, by a liquid spray apparatus of the initially described type, in which drive means for driving the spray plate comprise a vane wheel, or turbine wheel, adapted for being acted upon by a gas stream from a pressurized gas source and directed on to the vane wheel by means of a nozzle.

As a preferred feature, the drive means further comprise regulating elements being movable radially outwardly, at increasing speed of the vane wheel and under the influence of the resulting centrifugal forces, the vane wheel being in contact with the regulating elements and being displaced at least partially out of the range of the gas stream when the regulating elements move radially outwardly.

According to another preferred feature of the invention, the vane wheel is freely rotatably mounted on the shaft and the vane wheel and the disc means have vicinal faces turned toward each other and, on these vicinal faces, radially extending races for the regulating elements, e.g. metal balls. The drive means further comprise rib-shaped delimiting wall means protruding from the vicinal faces laterally of the races and being adapted for acting as cam means for transmitting the driving force of the vane wheel to the disc means by means of the balls.

BRIEF DESCRIPTION OF THE DRAWINGS

A preferred embodiment of the liquid spray apparatus according to the invention will be explained hereinafter more in detail having reference to the accompanying drawings in which.

DETAILED DESCRIPTION OF THE EMBODIMENT SHOWN IN THE DRAWINGS

Figure 1:
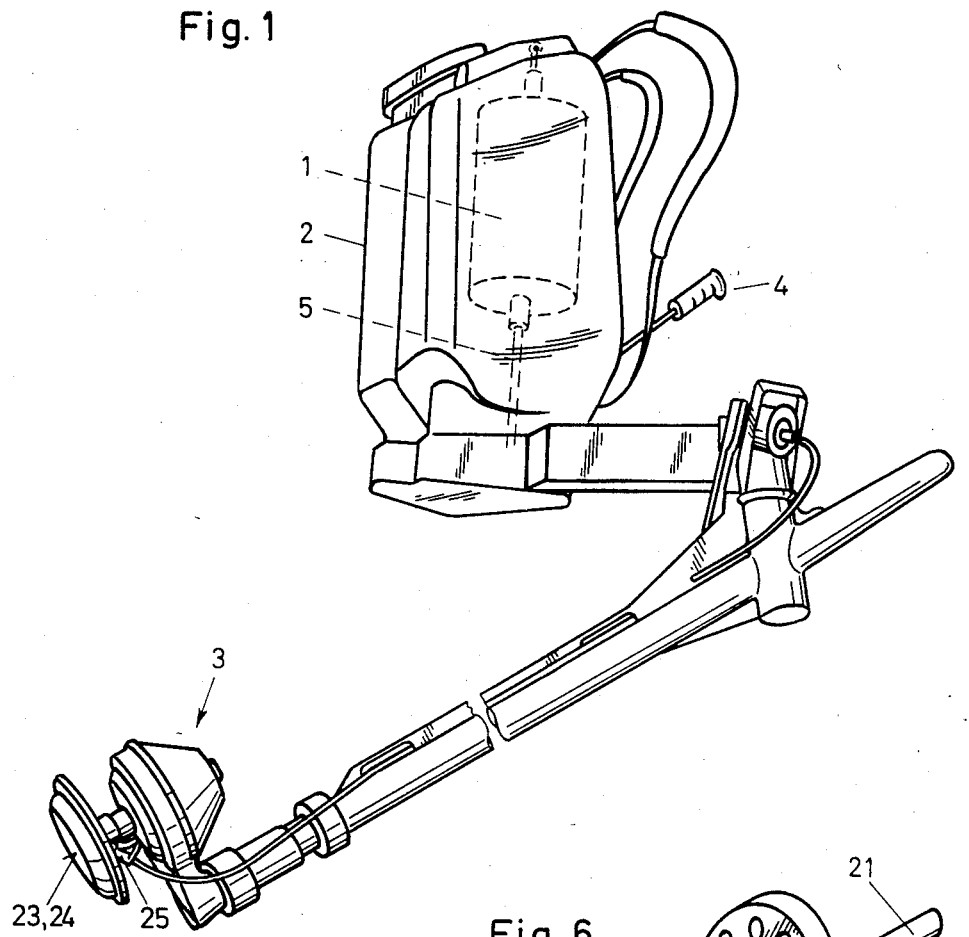
FIG. 1 is a perspective view of the preferred embodiment of the portable liquid spray apparatus according to the invention.

The preferred embodiment according to the invention comprises a double-acting manually operable air pump 1 serving as pressurized gas source, a liquid container 2 and a liquid distributing device 3. These units are advantageously assembled so as to be portable, to be carried on the back of the operator, as shown in FIG. 1.

Figure 2:
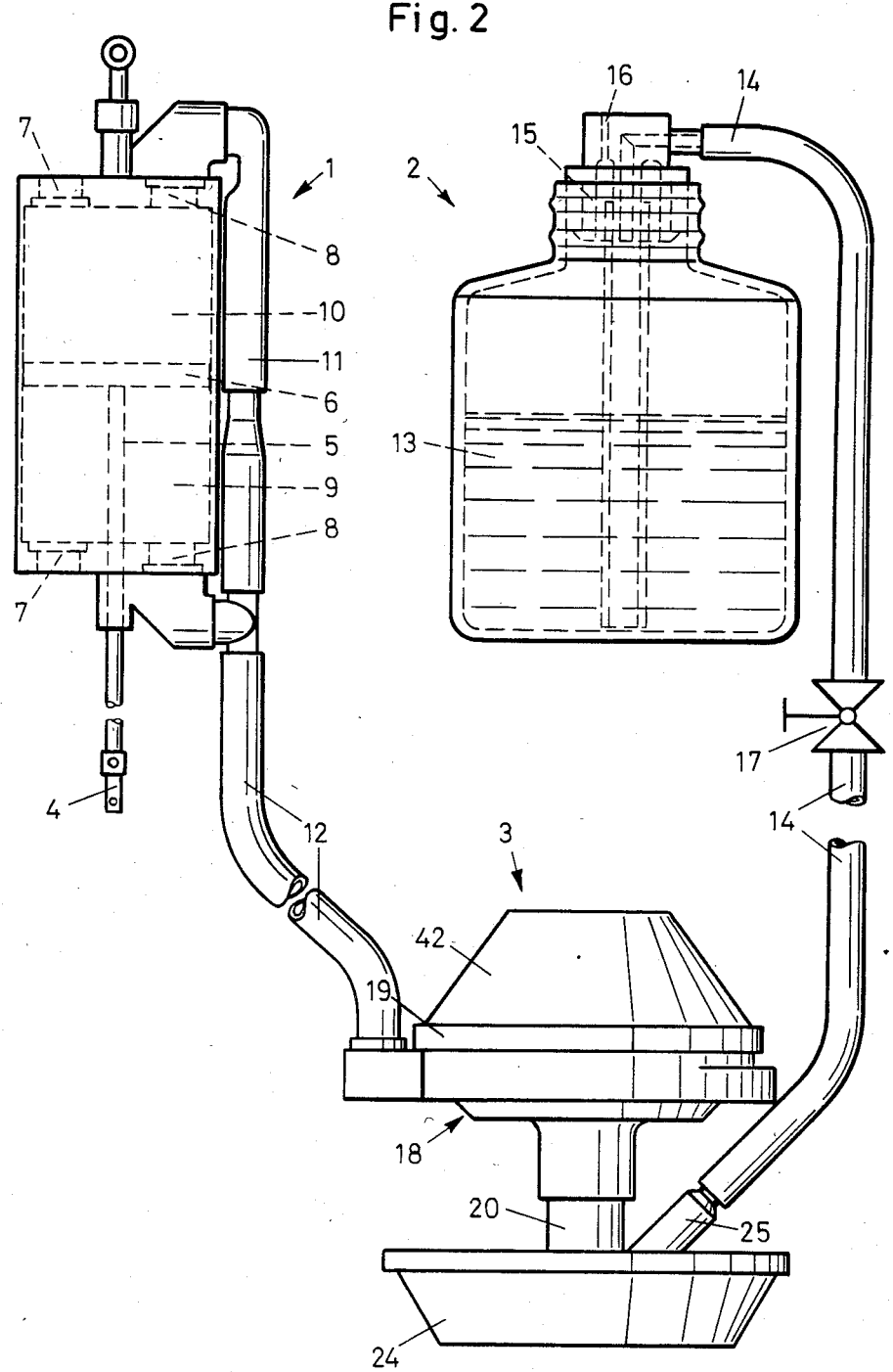
FIG. 2 shows schematically the layout of the embodiment shown in FIG. 1.
Figure 3:
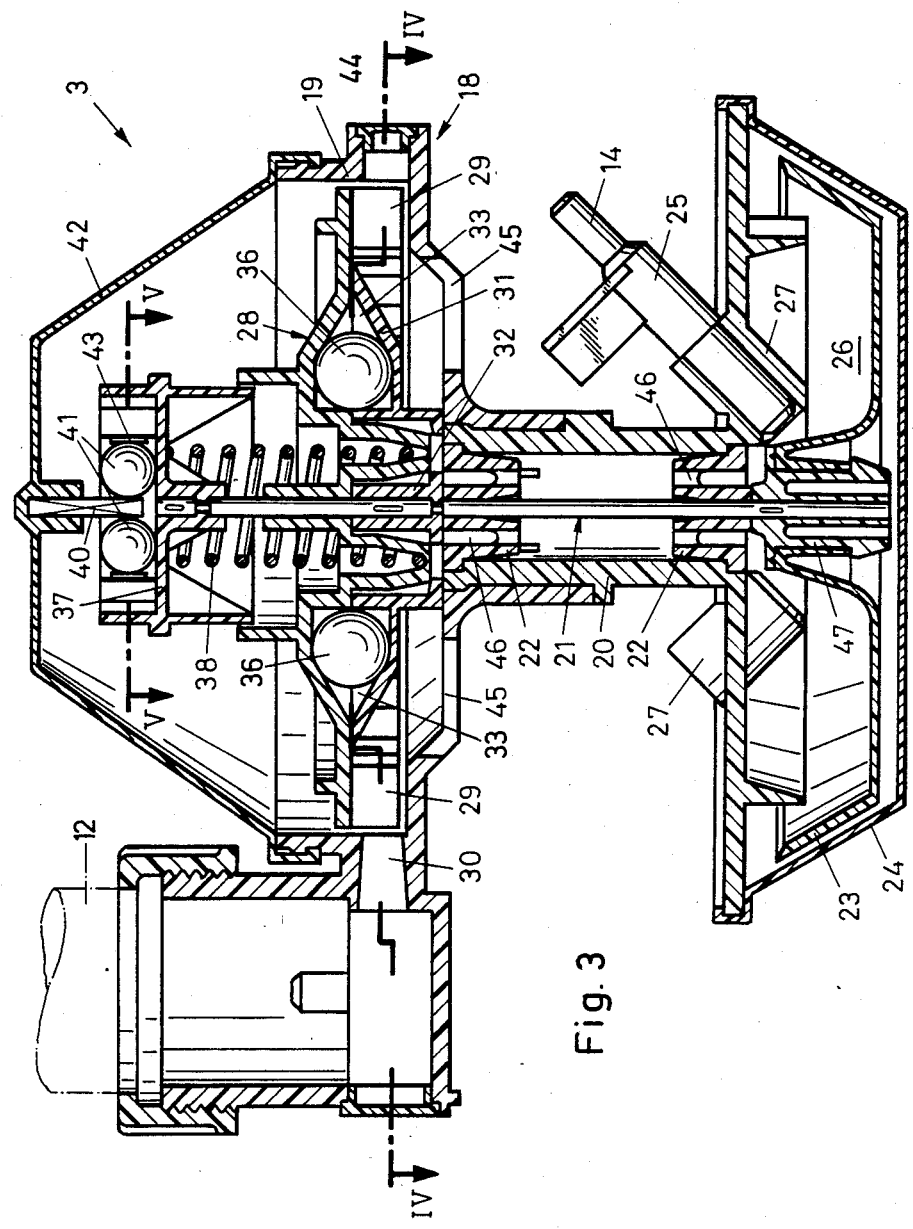
FIG. 3 is an axial sectional view of the liquid distributing unit of the apparatus shown in FIG. 1.
Figure 4:
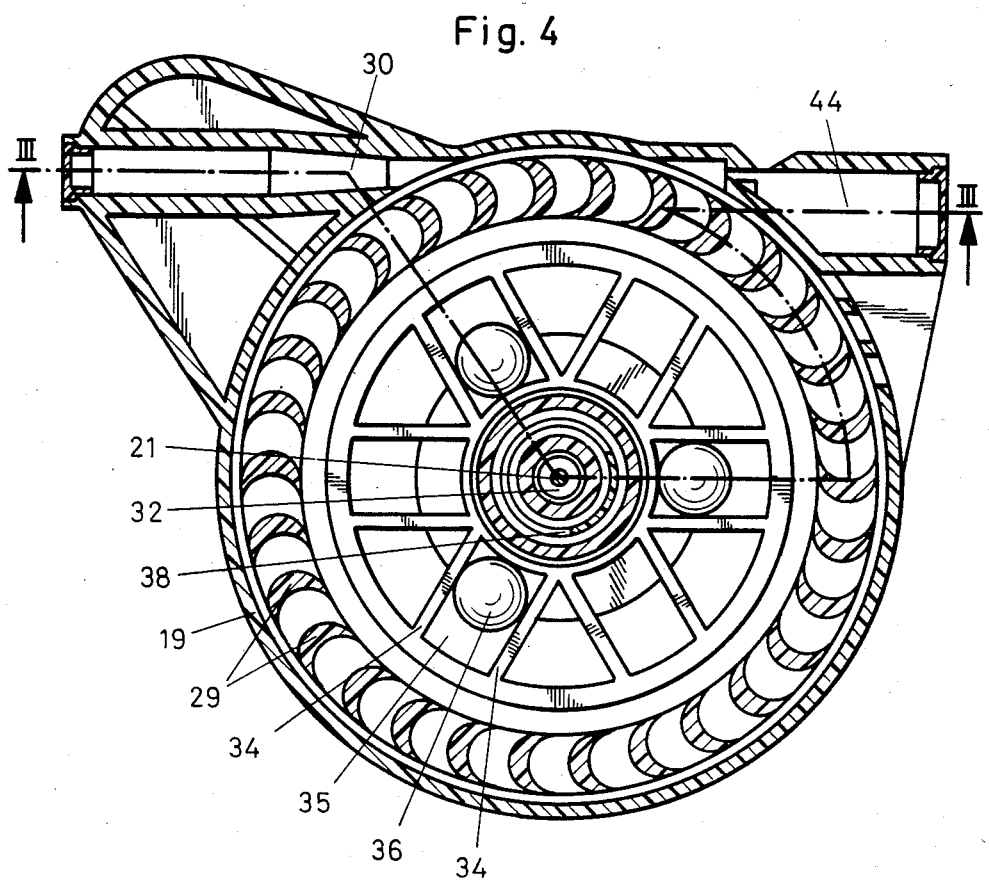
FIG. 4 is a cross-sectional view of the same unit in a plane indicated by IV—IV in FIG. 3.
Figure 5:
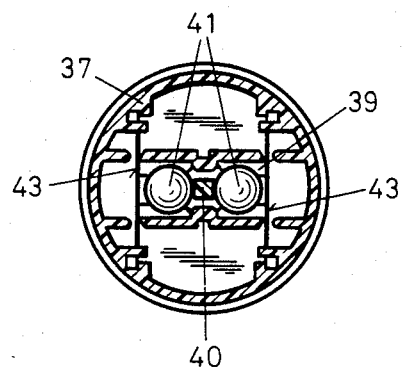
FIG. 5 is a cross-sectional view of part of the same unit in a plane indicated by V—V in FIG. 3.

The preferably double acting pump 1 which can be actuated manually by the operator by means of a handle 4, or a crank, is provided with a piston rod 5, on which the double-acting piston 6 is mounted. At the two ends of the cylinder space there are provided aspirating and pressure valves 7 and 8, respectively (FIG. 2), with the compressed air passing from the two cylinder subchambers 9 and 10 into a collecting tube 11 which is connected via a pressure line 12 with the distributing device 3. The size of the collecting tube 11 is so chosen as to produce a certain buffer effect on the air passing through the same, whereby the air supply is maintained relatively constant in spite of pressure fluctuations due to the pump strokes.

The liquid container 2 is filled with the liquid 13 to be distributed, which can be held under pressure. The liquid-dispensing line 14 also leads from the closure 15 which can be provided with an air vent 16 via a valve 17 to the distributing device 3.

Figure 6:
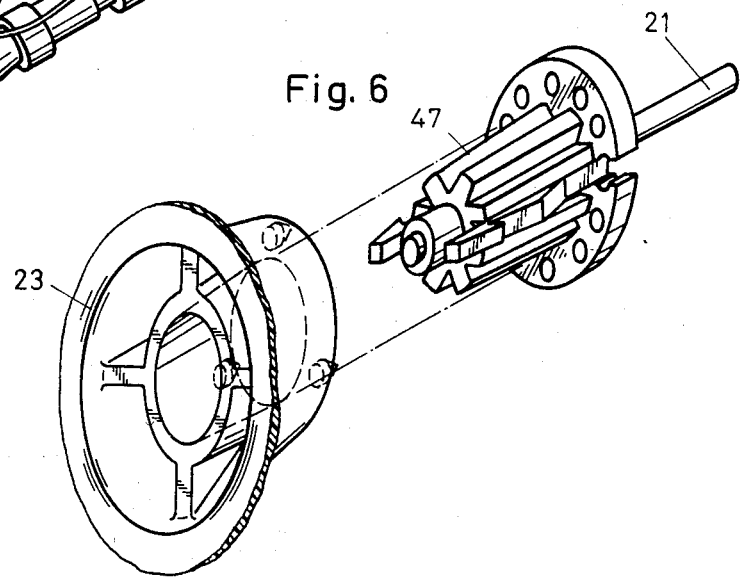
FIG. 6 is an exploded view, in perspective, of the distributing disc shaft of the liquid distributing unit.

The distributing device 3 is provided with a housing 18 consisting of an upper housing part 19 and a lower housing part 20 in which there is supported a drive shaft 21. The two bearings 22 of synthetic plastic resin are pressed into the cylindrical interior space of the lower housing part 20. The downwardly projecting end of the drive shaft 21 bears an annular cup-shaped distributing plate 23 the peripheral rim of which can be provided with gear teeth. In order to protect the distributing plate 23 while the apparatus is not in use, there is provided a removable protective cap 24. The distributing plate 23 is snap-connected detachably with a coupling hub 47, which is mounted firmly on the shaft 21 for rotation therewith, as shown in FIG. 6. One distributing plate can thereby be exchanged conveniently for another.

A calibrated nozzle 25 which is connected with the liquid-dispensing line 14 discharges into the annular cavity 26 on the inner side of the distributing plate 23 and introduces an exactly dosed amount of liquid per unit of time into this cavity 26. This liquid is then flung outwardly off the plate finely distributed in droplet form by the rotating plate 23. Several nozzle connecting sockets 27 are provided at the lower housing part 20, and can be used optionally.

The plate 23 is driven by means of a vane wheel (or turbine wheel) 28 which is mounted freely rotatably and axially displaceably on the drive shaft 21, and the bucket ring 29 of which is impinged upon by the compressed air tangentially directed on to the same by the air nozzle 30. The air nozzle 30 which is arranged at the apparatus housing 18 tangentially with regard to the vane wheel 28, is connected via the air pressure line 12 with the pump 1.

In order to guarantee a uniform speed of the spray plate 23, there are provided speed-regulating means. The turbine wheel 28 is disposed vicinal to a cam disc 31 which is mounted firmly, below the turbine wheel 28, on the drive shaft 21 for rotation therewith, with its hub 32 being pressfit on the shaft. Between the disc 31 and the wheel 28, there is located an annular space 33 which narrows in radially outward direction, having a wedge-shaped cross section. A number of ribs 34 are arranged on vicinal faces, turned toward each other, of the vane wheel 28 and the cam disc 31, which ribs delimit on each of these two parts six radially outwardly extending races 35, opposite, and registering with, each other, with three metal balls 36 as regulating elements lodged freely movably in three of these races 36, one ball per race.

A spring 38, which is supported on an upper abutment flange 37 mounted on the shaft 21 for rotation therewith, urges the turbine wheel 28 with bias against the ball 36 which is thereby pressed in turn against the cam disc 31.

At increasing speed of the shaft 21, the balls 36 move, under the influence of centrifugal forces, outwardly into the wedge-like narrowing zone of the annular space 33 and thereby move the turbine wheel 28 upwardly on the drive shaft 21 against the force of the spring 38, so that the vanes are only impinged upon by part of air stream, whereby the speed of the wheel 28 is again reduced. The driving force is transmitted by means of the balls 36 and the ribs 34 on to the cam disc 31. The speed-regulating device is so adjusted that an optimal speed is hunted for automatically. A corresponding choice of the spring 38 and of the number of balls 36 determines the desired optimal speed to be hunted.

In order to simplify the use of the liquid spray apparatus according to the invention, means for generating acoustic noises are provided which announce to the user that the speed of the vane wheel has increased above a maximum or decreased below a minimum permissible limit speed.

To this end, the abutment flange 37 mounted fixedly, as supporting means, on the drive shaft 21 at the upper end thereof and for rotation therewith, is provided with a radial guiding channel 39 in which there are lodged two additional, radially displaceable balls 41. A square bolt 40 which is fixedly mounted in a housing cover 42, projects downwardly into the interspace between the two balls 41. At high speed, the balls 41 are urged radially outwardly by centrifugal forces, against the bias of leaf springs 43.

At decreasing speed these balls 41 move, due to the pressure of the leaf springs 43 inwardly and hit against the square bolt 40 which serves as sound-generating body, whereby a noise as in a kettle drum is generated inside the cover 42, which warns the operator that the pump output must be increased. The cover 42 serves in this case as sound amplifier.

In order to warn the operator of too high a speed, which is connected with an unnecessarily high pumping effort being made by him, there is provided a whistle 44 which is disposed in the line of extension of the air nozzle 30 on the other side of the vane ring 29. When the turbine wheel 28 is lifted due to an excessively high speed and is thereby moved out of the air stream, a part of the air will no longer stream through the air exit openings 45 in the housing, but will stream through the whistle 44 and actuate the latter.

The operation of the apparatus is thus rendered extremely simple. The operator need only pay attention to the acoustic signals and actuate the pump accordingly more or less vigorously. Even after a short period of initial training, the apparatus can be operated automatically in a correct manner, so that an optimal distribution of the liquid is guaranteed and the operator need not perform any unnecessary work effort.

As the apparatus according to the invention does not comprise any batteries or electric motor, it is easy to handle and of light weight, and there is no danger of corrosion due to leaking acid. The apparatus is built essentially of parts made from synthetic resin material, whereby a compact structure and cleaning without problems are guaranteed. Cleaning can be effected, for instance, by rinsing and dipping the apparatus in water. For this purpose, all internal spaces are provided with openings 45, 46 through which the water can flow out.

The drive has a running reserve, which is attained, on the one hand, by the burner effect of the air in the collecting tube of the air pump, and, on the other hand, by the inertia of the vane wheel whose diameter is chosen as large as feasible. Apart from their regulating functions, the balls also afford an increase of the inertia of the vane wheel, to which end up to six balls of a heavy material can be used. This running reserve achieved by stored energy affords a short period of rest to the operator after he has produced the highest speed of the spray disc.

What is claimed is:

1. A liquid spray apparatus for dispensing liquid droplets of constant droplet size comprising a liquid container; a liquid distributing device in fluid communication with said liquid container and comprising a shaft, a spray head, a spray plate contained in said spray head and mounted on said saft, drive means for said spray plate, said drive means comprising a vane wheel mounted axially displaceably on said shaft adapted for being acted upon by a gas stream, said mounting of both said spray plate and said vane wheel on said shaft resulting in common rotation of the two, and means for regulating the speed of said spray plate comprising regulating elements being movable radially outwardly at increasing speed of said vane wheel and under the influence of centrifugal forces, said vane wheel being coupled to said regulating elements and being displaced at least partially out of the range of said gas stream when said regulating elements move radially outwardly; a pressurized gas source for generating said gas stream and a nozzle directing said gas stream on to said vane wheel.

2. A liquid spray apparatus as described in claim 1, wherein an air pump generating an air stream constitutes said gas source.

3. A liquid spray apparatus as described in claim 1, wherein said drive means further comprise disc means mounted on said shaft for rotation therewith and vicinal to said vane wheel, and an annular space between said disc means and said vane wheel, said space being of radially outwardly narrowing configuration and having a wedge-shaped radial cross section, said regulating elements being balls lodged in said annular space.

4. A liquid spray apparatus as described in claim 3, wherein said vane wheel is freely rotatably mounted on said shaft and wherein said vane wheel and said disc means have vicinal faces turned toward each other and, on said vicinal faces, radially extending races for said balls; and said drive means further comprise rib-shaped delimiting wall means protruding from said vicinal faces laterally of said races, and being adapted for acting as cam means for transmitting the driving force of the vane wheel to said disc means by means of said balls.

5. A liquid spray apparatus as defined in claim 3, wherein said drive means further comprise spring means urging said vane wheel into contact with said balls and said disc means.

6. A liquid spray apparatus as defined in claim 1, further comprising acoustic means for generating a noise when the speed of said spray plate is outside the range extending from a determined maximum speed to a determined minimum speed.

7. A liquid spray apparatus as defined in claim 6, wherein said acoustic means is a whistle, and wherein axial displacement of said vane wheel along said shaft at least partially out of said gas stream permits a portion of said gas stream to activate said whistle.

8. A liquid spray apparatus as defined in claim 6, wherein said acoustic means comprise a sound-generating body, and wherein said drive means further comprises ball race means mounted on said shaft for rotation therewith, balls in said ball race means, said balls being radially displaceable outwardly when the speed of said shaft increases, and spring means urging said balls radially inwardly to impact upon said sound generating body when the speed of said shaft decreases.

9. A liquid spray apparatus as defined in claim 1, further comprising a housing surrounding said liquid distributing device, said nozzle being mounted in said housing so as to direct said gas stream tangentially on to said vane wheel.

10. A liquid spray apparatus as described in claim 1, wherein said gas source is a double-acting, manually operable piston air pump.

* * * * *